(12) United States Patent
Ge et al.

(10) Patent No.: US 10,838,401 B2
(45) Date of Patent: Nov. 17, 2020

(54) PRODUCING INSTRUCTIONS THAT CONTROL THREE-DIMENSIONAL PRINTING FROM VOXELS

(71) Applicant: HEWLETT-PACKARD DEVELOPMENT COMPANY, L.P., Houston, TX (US)

(72) Inventors: Ning Ge, Palo Alto, CA (US); Jun Zeng, Palo Alto, CA (US); Steven J. Simske, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 57 days.

(21) Appl. No.: 16/077,327

(22) PCT Filed: Jan. 25, 2017

(86) PCT No.: PCT/US2017/014910
§ 371 (c)(1),
(2) Date: Aug. 10, 2018

(87) PCT Pub. No.: WO2018/140004
PCT Pub. Date: Aug. 2, 2018

(65) Prior Publication Data
US 2019/0056716 A1 Feb. 21, 2019

(51) Int. Cl.
*G05B 19/4099* (2006.01)
*B29C 64/393* (2017.01)
(Continued)

(52) U.S. Cl.
CPC ........ *G05B 19/4099* (2013.01); *B25J 9/1664* (2013.01); *B25J 11/005* (2013.01);
(Continued)

(58) Field of Classification Search
CPC .................................................. B29C 67/0059
(Continued)

(56) References Cited

U.S. PATENT DOCUMENTS

2003/0186042 A1 10/2003 Dunlap et al.
2004/0141018 A1 7/2004 Silverbrook
(Continued)

FOREIGN PATENT DOCUMENTS

RU 2258010 C2 8/2005
WO 2015042422 A1 3/2015
(Continued)

OTHER PUBLICATIONS

Molitch-Hou, "Voxel8 Ships First Electronics 3D Printer to Google ATAP", Retrieved from Internet: https://www.engineering.com/3DPrinting/3DPrintingArticles/ArticleID/12282/Voxel8-Ships-First-Electronics-3D-Printer-to-Google-ATAP.aspx, Jun. 2, 2016, 4 Pages.
(Continued)

Primary Examiner — Suresh Suryawanshi
(74) Attorney, Agent, or Firm — Trop Pruner & Hu PC (57) ABSTRACT

In some examples, a data representation is received that includes voxels relating to a volumetric property and a functional property of portions of a three-dimensional (3D) object to be formed by a 3D printing system, and trajectory voxels containing information to guide operation of a machine that manipulates portions of the 3D object during 3D printing. Information of the voxels relating to the volumetric property and the functional property and the information of the trajectory voxels are combined to produce instructions that control the 3D printing system to build the 3D object.

17 Claims, 4 Drawing Sheets

(51) Int. Cl.
  *B25J 9/16* (2006.01)
  *B25J 11/00* (2006.01)
  *B33Y 50/02* (2015.01)
  *B29C 64/386* (2017.01)
  *G06F 7/00* (2006.01)
  *B29C 64/165* (2017.01)
  *B33Y 50/00* (2015.01)

(52) U.S. Cl.
  CPC .......... *B29C 64/386* (2017.08); *B29C 64/393* (2017.08); *B33Y 50/02* (2014.12); *G06F 7/00* (2013.01); *B29C 64/165* (2017.08); *B33Y 50/00* (2014.12)

(58) Field of Classification Search
  USPC ........................................................ 700/119
  See application file for complete search history.

(56) References Cited

U.S. PATENT DOCUMENTS

| | | |
|---|---|---|
| 2011/0222081 A1 | 9/2011 | Yi et al. |
| 2012/0065755 A1 | 3/2012 | Steingart et al. |
| 2012/0224755 A1* | 9/2012 | Wu .......................... G06T 17/00 382/131 |
| 2013/0209600 A1 | 8/2013 | Tow |
| 2015/0241714 A1* | 8/2015 | Allione ............ B29D 11/00432 351/159.73 |
| 2016/0185045 A1* | 6/2016 | Linnell .................. B33Y 50/02 264/401 |
| 2017/0116779 A1* | 4/2017 | Lalish ..................... G06T 15/04 |
| 2018/0018810 A1* | 1/2018 | Morovic ............... G06T 15/503 |
| 2018/0028335 A1* | 2/2018 | Kreeger ................ A61F 2/5046 |
| 2018/0281278 A1* | 10/2018 | George ............... H01S 5/18355 |
| 2019/0039368 A1* | 2/2019 | Zeng ..................... B29C 64/386 |

FOREIGN PATENT DOCUMENTS

| | | |
|---|---|---|
| WO | 2016081496 A1 | 5/2016 |
| WO | 2016119883 A1 | 8/2016 |

OTHER PUBLICATIONS

Glasschroeder et al., "Powder-bed Based 3d-printing of Function Integrated Parts", 1iwb Institute for Machine Tools and Industrial Management, 2014, 18 Pages.

"HP Delivers World's First Production-Ready 3D Printing System", Additive Manufacturing, Retrieved from Internet: http://additivemanufacturing.com/2016/05/18/hp-delivers-worlds-first-production-ready-3D-printing-system/, 2016, 7 Pages.

"Monolith is a Voxel-based Modeling Engine for Multimaterial 3D Printing", Monolith, Retrieved from Internet: http://www.monolith.zone/#introduction, 2016, 18 Pages.

Tibbits, "4D Printing: Producing Programmable Materials That Transform Over Time", Retrieved from Internet: http://institute.swissre.com/research/risk_dialogue/magazine/3D_printing/4D_printing_Producing_programmable_materials.html, 2016, 4 Pages.

Sinumerik et al., "G-code", Retrieved from Internet: https://en.wikipedia.org/wiki/G-code, 2016, 51 Pages.

* cited by examiner

PRODUCING INSTRUCTIONS THAT CONTROL THREE-DIMENSIONAL PRINTING FROM VOXELS

BACKGROUND

A three-dimensional (3D) printing system can be used to form 3D objects. A 3D printing process involves depositing successive layers of build material(s) under control of a computer based on an electronic representation of a 3D object. The layers are successively added until the entire 3D object is formed.

BRIEF DESCRIPTION OF THE DRAWINGS

Some implementations of the present disclosure are described with respect to the following figures.

DETAILED DESCRIPTION

In the present disclosure, use of the term "a," "an", or "the" is intended to include the plural forms as well, unless the context dearly indicates otherwise. Also, the term "includes," "including," "comprises," "comprising," "have," or "having" when used in this disclosure specifies the presence of the stated elements, but do not preclude the presence or addition of other elements.

A three-dimensional (3D) object printed by a 3D printing system can have functional features, in addition to physical characteristics such as a shape, size, and material(s) of the 3D object. Forming a 3D object with functional features can increase the complexity associated with the 3D printing process. Additionally, robotics (or mechatronics or other techniques of additive or subtractive manufacturing) may be involved in the 3D printing process, where a robot (or robotic arm) can be used to move parts of the 3D object during the 3D printing process. Traditional representations, such as volumetric voxels, do not adequately represent functional features or use of robotics during the 3D printing process. A voxel can refer to a 3D pixel that has a volume, and the volumetric voxel can contain information that defines geometric properties such as a size and a shape of a portion of a 3D object represented by the volumetric voxel.

In accordance with some implementations of the present disclosure, a 3D printing hybrid data representation can be used in performing 3D printing by a 3D printing system, where the hybrid data representation includes multiple different data representations that can be synthesized together to perform 3D printing of a 3D object with a functional feature and which can involve the use of machines that physically manipulate parts formed during 3D printing. Examples of machines that physically manipulate parts formed during 3D printing can include a robot that can grab a part and move the part from a first location to a different location along a trajectory during 3D printing. Alternative examples of machines that can physically manipulate parts formed during 3D printing can include a cutter that can be used to cut, along a trajectory, a part formed by the 3D printing to a target shape. More generally, a machine that physically manipulates a part during 3D printing can refer to any machine that physically touches a part formed by the 3D printing to change a characteristic or location of the part along a respective trajectory.

The different data representations of the hybrid data representation can include, as examples, the following: a functional voxel, a trajectory voxel, and a curve size voxel. Although specific data representations are listed above, it is noted that in other examples, alternative or additional data representations can be part of the hybrid data representations, or some of the listed data representations can be omitted from the hybrid data representations.

A functional voxel can include information of volumetric properties and functional properties of a portion of a 3D object to be formed. Examples of functional properties can include any or some combination of the following: magnetism, conductivity, density, porosity, strength, elasticity, transparency, hardness, movement property (e.g., ability to slide, rotate, or otherwise move), and so forth. More generally, a functional property can refer to a property that quantifies or otherwise indicates a characteristic that can affect how a 3D object portion interacts with another object (e.g., the magnetism of a 3D object portion can affect a magnetic interaction between the 3D object and another object, etc.). Additionally, the functional voxel can include information relating to phase control, where a printed material can be transferred into another material or with a different characterization under a certain condition, such as in response to ultraviolet light, heat, and so forth. The functional voxel can specify how values of a functional property can vary in 3D space.

Examples of volumetric properties can include any or some combination of the following: a material, size, shape, and color of a part of the 3D object. The functional voxel can specify how values of a volumetric property can vary in 3D space.

Although reference is made to including information of volumetric properties and functional properties in a functional voxel, it is noted that in other examples, the corresponding information can be included in respective different voxels. For example, functional properties are included in functional voxels, volumetric properties such as size, material, and color are included in volumetric voxels, and shape is included in vector slices (where a vector slice is a type of voxel). A vector slice representing a shape includes information regarding an inner part of a 3D object portion that has the shape, and information regarding an outer part of the 3D object portion, where the information regarding the outer part defines a boundary of the 3D object portion. Different vector slices can correspond to different locations in 3D space. Such slices may be viewed as tomographic slices through a volume. For example, each vector slice corresponds to a particular z-coordinate of a part along a z axis, which is the axis along which layers of build material are added to form the part.

A trajectory voxel includes information that guides movement, along a trajectory (or multiple trajectories), of a machine (or a part of the machine) that manipulates a 3D object portion formed during 3D printing. For example, the trajectory voxel can include control information (in the form of commands) to guide movement of a robot (the entire robot or a part of the robot such as the robot's arm) and/or control information (in the form of commands) to guide operation of a cutter.

Control information to guide movement of a robot can include a machine code vector that contains machine code used to control operation of the robot (e.g., control operation of a robot arm, such as to move the robot arm to pick up and drop off parts, etc.) during the 3D printing. The machine code vector includes commands controlling the robot for a respective portion of a 3D object. Different machine code vectors can be associated with different portions of the 3D object for controlling robot manipulation of the different portions of the 3D object. The commands of a machine code vector can include G-code commands in some examples. G-code refers to a numerical control programming language that is used to control automated machine tools, including robots. Each machine code vector includes G-codes or more generally, commands that control operation of the robot in a respective location of the 3D space.

Control information to guide operation of a cutter can include computer numerically controlled (CNC) machining information (which can also be included in a machine code vector), which controls the cutter to remove (by cutting) a portion of a 3D object during the 3D printing. Providing control information to guide operation of a cutter allows for the inclusion of subtractive manufacturing processes during 3D printing, in addition to additive manufacturing processes involving the formation of successive layers of a 3D object performed by the 3D printing system. An example use of a cutter is to remove a sprue on the surface of a component associated with co-manufacturing accessories along with the component; for example, a breakoff tag that can be used for trademark or tracking purposes can be removed. The cutter can be used for other purposes in other examples.

The curve size voxel can include information relating to sizes of curves (such as lines) to be formed. For example, the curve size voxel can specify widths of conductive traces or other structures (electrical structures, optical structures, magnetic structures, etc.) as a function of space.

Figure 1:
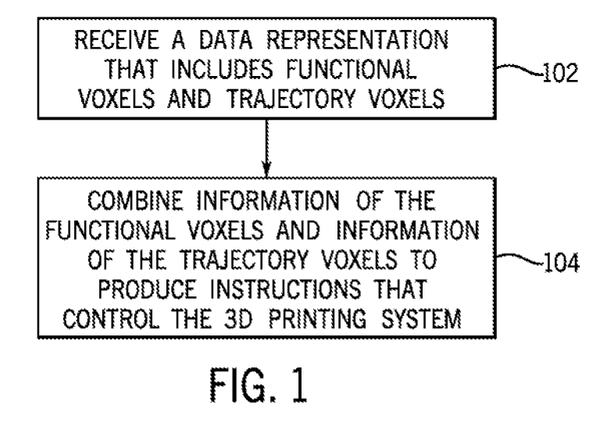
FIG. 1 is a flow diagram of a process of producing instructions that control a three-dimensional (3D) printing system, according to some examples.

FIG. 1 is a flow diagram of a process according to some examples. The process of FIG. 1 can be performed in a 3D printing system, and more specifically, can be performed by a controller in the 3D printing system. As used here, the term "3D printing system" can refer to any type of additive manufacturing system that is able to form a 3D object by successively adding layers of build material, and processing such layers as they are added. As used here, a "controller" can refer to a hardware processing circuit, which can include any or some combination of the following: a microprocessor, a core of a multi-core microprocessor, a microcontroller, a programmable integrated circuit device, a programmable gate array, a central processing unit, a general processing unit, an application specific integrated circuit (ASIC) device, a memory computing unit, and so forth. In further examples, a controller can include a combination of a hardware processing circuit and machine-readable instructions (software or firmware) executable on the hardware processing circuit.

The process of FIG. 1 includes receiving (at 102) a data representation that includes voxels relating to a volumetric property and a functional property of portions of a 3D object to be formed by the 3D printing system. The voxels that relate to the volumetric property and the functional property can include functional voxels that include both the volumetric property and the functional property. Alternatively, the voxels that relate to the volumetric property and the functional property can include distinct voxels, such as a functional voxel that includes information of a functional property, a volumetric voxel that includes information of a volumetric property, and a vector slice that defines a shape.

The data representation also includes trajectory voxels containing information to guide operation of a machine that manipulates portions of the 3D object during 3D printing.

The process includes combining (at 104) information of the voxels that relate to the volumetric property and the functional property and the information of the trajectory voxels to produce instructions that control the 3D printing system to build the 3D object.

Although the foregoing refers to a received data representation that includes voxels that relate to the volumetric property and the functional property and trajectory voxels, it is noted that in further examples, the received data representation can additionally include curve size voxels, as discussed above.

Combining the different voxels of the received data representation to produce instructions to control 3D printing generally involves mapping the different voxels to different locations in a 3D space, and then producing 3D printing instructions to achieve the various properties set forth in the different voxels. For example, the combining can include mapping volumetric property values and functional property values in the voxels relating to the volumetric property and the functional property to respective the locations in 3D space. The combining further includes associating the machine commands in the trajectory voxels to respective portions of the 3D object.

A functional property value mapped to a respective location in the 3D space can control the type of build material to use, and an amount of the build material. Different types of build materials can be used for providing different functional properties. Print instructions can thus be produced to control a build material deposition equipment in a 3D printing system.

A volumetric property value mapped to a respective location in the 3D space can control where a printing fluid (such as function-creation agents, for example, fusing agents, detailing agents, agents containing colorants to provide surface color, agents containing conductive micro/nano particles to provide electrical conductance, etc.) is to be dispensed, and how much of the printing fluid is to be dispensed. Additionally, a volumetric property can define the shape (including horizontal extent and thickness) of a portion of the 3D object, which can control a thickness of a build material layer and how many layers of a build material are to be formed. Print instructions can thus be produced to control the build material deposition equipment and a fluid dispensing equipment of the 3D printing system to deposit the build material layer(s) and deliver the printing fluids.

Associating machine commands in trajectory voxels to respective portions of the 3D object (such as layers of build material or other portions of the 3D object) allows for the machine commands to be applied to control manipulating of the associated 3D object portions. The print instructions can include the machine commands to control a robot or a cutter to perform the manipulating of the associated 3D object portions.

Pause commands can also be added to the produced print instructions to pause certain 3D printing operations (e.g., deposition of build material by the build material deposition equipment, fluid dispensing by the fluid dispensing equipment, etc.) while the machine (e.g., the robot or cutter) controlled by the machine commands are executed to control operation of the machine. Pausing certain 3D printing operations is to prevent a collision between the certain 3D printing operations and the operations of the machine controlled by the machine commands of the trajectory voxels.

Information in curve size voxels can define sizes of curves (e.g., conductive traces) to be formed in the 3D object. A curve size voxel may have a specified cross section, for example, a circular cross section having a radius, or a rectangular cross-section. The dimension of the cross section may be determined by a functional property (e.g., electrical resistivity) that a curve having the specified size is to provide. The information in the curve size voxels can be mapped to locations in the 3D space, such that a curve can intercept a layer of build material. The curve to be formed can override the volumetric property of a 3D object portion—in other words, the volumetric property of a 3D object portion in a space where the curve is to be formed can be disregarded, since that space will be occupied by the curve. Print instructions are produced to deposit the curves at the specified locations.

More generally, since the different voxels control different aspects associated with building a given portion of a 3D object, the combining of the information of the different voxels (at 104 in FIG. 1) seeks to ensure that equipment associated with the 3D printing system that control the different aspects are synchronized with respect to each other, such that there are no collisions in operations of the different equipment when forming the given 3D object portion. A collision between operations of different equipment can refer to a condition where a first equipment performs an action that is inconsistent with an action taken by a second component, or that would interfere with or otherwise undo the action of the second equipment.

Also, combining the information of the different voxels can refer to synchronizing, from both a time and geometric perspective, the different operations of the 3D printing system controlled by the information in the different voxels. For example, a functional voxel that includes information of a volumetric property and a functional property that can include coordinates in 3D space, including in the build direction (z direction) as well as in the horizontal direction that corresponds to a layer of build material (the x and y axes, which are perpendicular to the z axis). Similarly, a trajectory voxel can include coordinates associated with the control information in the trajectory voxel. The information of the functional voxels and the information of the trajectory voxels can be aligned based on coordinates included in the functional voxels and the trajectory voxels.

Figure 2:
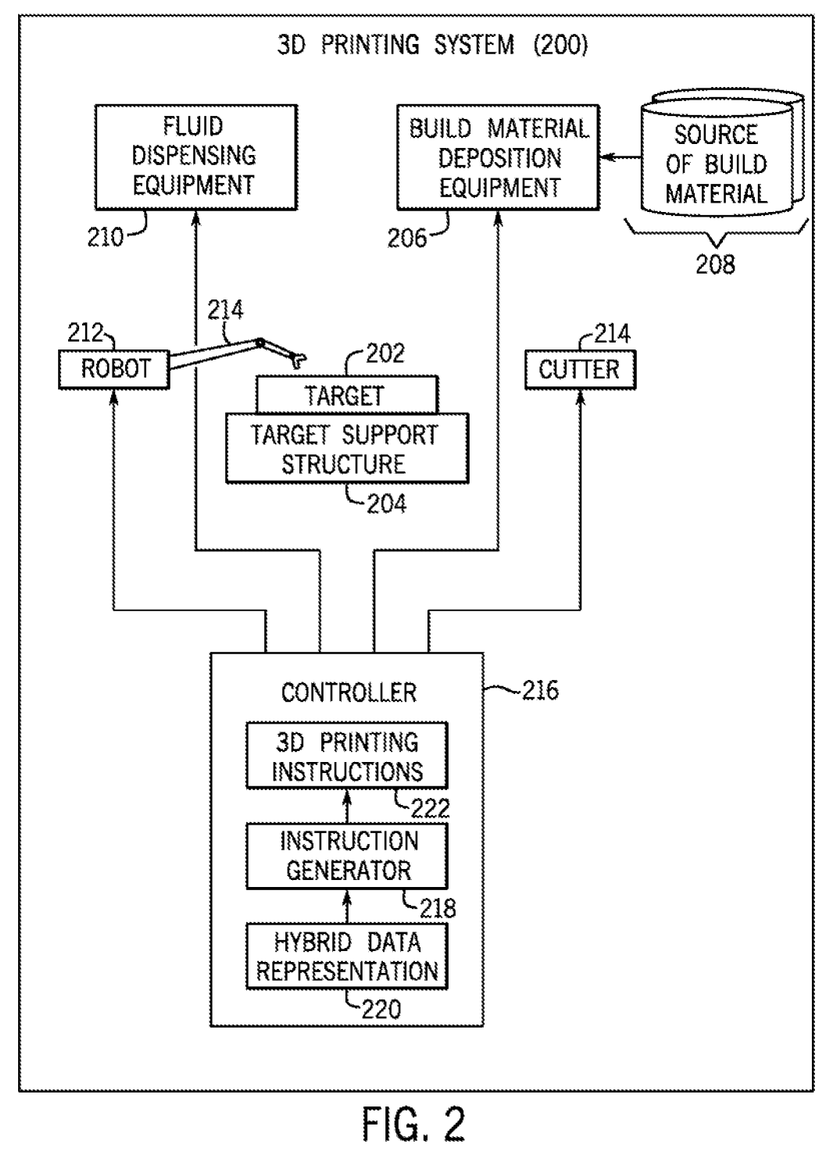
FIG. 2 is a block diagram of a 3D printing system according to some examples.

FIG. 2 shows an example 3D printing system 200, which includes various equipment that can be involved in performing 3D printing to form a target 3D object 202, which is provided on a target support structure 204 (e.g., a build platform or build bed). The various equipment include a build material deposition equipment 206, which can deposit layers of build material onto the target 202. The build material deposition equipment 206 receives build material from different sources 208 of build material. Build material deposition equipment can select which of the sources 208 of build material to use for depositing a layer of build material onto the target 202.

The 3D printing system 200 further includes a fluid dispensing equipment 210, to deposit fluid onto the target 202. For example, the fluid can include ink, such as color ink. As further examples, the fluid can include a fusing agent to fuse powder in a layer of build material, a detailing agent, and so forth.

The 3D printing system 200 further includes a robot 212, which has a robot arm 214 that can be moved to grab a portion of the target 3D object 202 to move the portion from one location to another location along a trajectory. In addition, the 3D printing system 200 can include a cutter 214, which can cut a portion of the target 3D object 202 along a trajectory. In some examples, either the robot 212 or the cutter 214 can be omitted.

The 3D printing system 200 also includes a controller 216, which controls 3D printing operations using the various equipment 206, 210, 212, and 214 of the 3D printing system 200. The controller 216 can send control commands to each of the build material deposition equipment 206, the fluid dispensing equipment 210, the robot 212, and the cutter 214.

The controller 216 includes an instruction generator 218, which can be in the form of machine-readable instructions executed by the controller 216. Alternatively, the instruction generator 218 can be implemented as a hardware processing circuit in the controller 216.

The instruction generator 218 receives a hybrid data representation 220, which can include various different voxels as discussed above. The instruction generator 218 combines the information of the different voxels in the hybrid data representation 220, to produce 3D printing instructions 222, which can be executed by the controller 216 to control the various equipment 206, 210, 212, and 214 when building the target 3D object 202.

Figure 3:
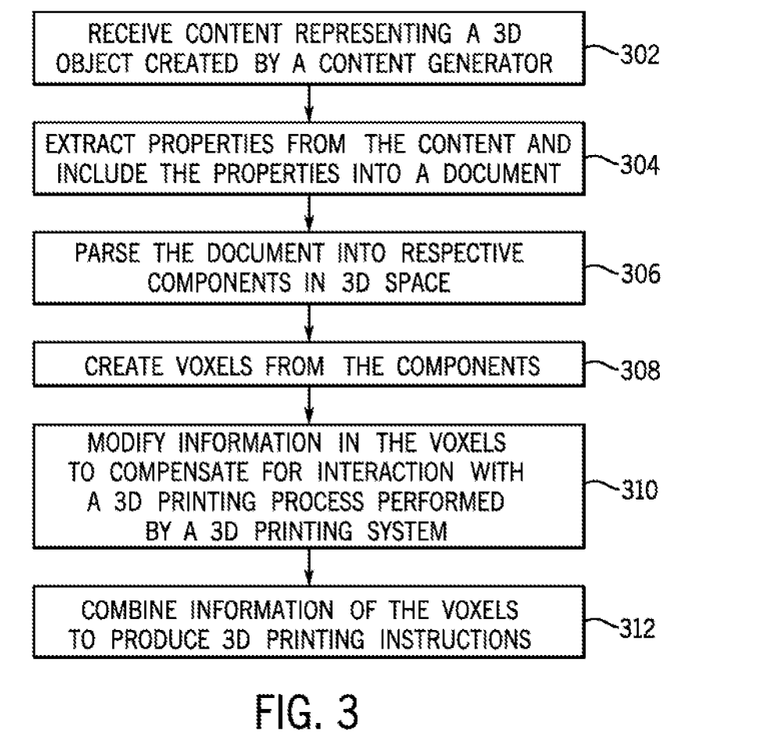
FIG. 3 is a flow diagram of a process of producing instructions that control a 3D printing system, according to further examples.

FIG. 3 is a flow diagram of a process according to further implementations. The process of FIG. 3 can be performed by a system, which can be implemented as a computer or by an arrangement of multiple computers.

The process of FIG. 3 receives (at 302) content representing a 3D object created by a content generator. For example, the content generator can include a computer-aided design (CAD) application that a user can use to generate a graphical representation of the 3D object, along with various properties associated with the 3D object. The graphical representation and associated properties make up the content that is received (at 302). In other examples, the content generator can include a scanner that is able to scan a physical object. For example, the scanner can include a computerized tomography (CT) scanner, which is able to take X-ray images of the physical object from different angles and to combine such X-ray images to create cross-sectional images, or image slices, of the physical object. The image(s) produced by the scanner, along with associated properties, make up the content that is received (at 302). In other examples, other types of content generator can be used to create content representing a 3D object.

The process of FIG. 3 further includes extracting (at 304) properties from the content and including the properties into a document or another type of data representation. For example, the properties that can be extracted and added into the document can include any or some combination of the following: volumetric properties, functional properties, sizes of curves to be formed (e.g., sizes of conductive traces to be formed), movement trajectories of a robot, cutting trajectories of a cutter, and so forth.

Based on the content generated by the content generator, a manufacturing plan can be devised based on equipment available, including 3D printers, robots, cutters, etc. Based on the manufacturing plan, additional properties that include curve sizes, G-codes, cutter machine codes, and so forth, can be generated and added to the document.

The process further includes parsing (at 306) the document into respective components in 3D space, where the components can include shape, volumetric properties, functional properties, trajectory information, curve size information, and so forth. Each component is parsed into respective locations in the 3D space.

The process further includes creating (at 308) voxels from the components. Each component is analyzed separately, and provided into corresponding voxels. For example, the shape of the 3D object included in the document is sliced into vector slices. Volumetric properties and functional properties are voxelized into corresponding voxels (e.g., functional voxels), where each voxel corresponds to a respective different location in the 3D space. Trajectory information can be included into trajectory vectors, such as a vector including machine code (e.g., G-code) that controls an operation of a robot, or a vector including machine code (e.g., CNC machining code) that controls a cutter.

The process further includes modifying (at 310) the information in the voxels to compensate for interaction with a 3D printing process performed by a 3D printing system. For example, the 3D printing process can produce heat that can affect various properties of the 3D object. Heat produced from forming one portion of the 3D object can affect how another portion of the 3D object is formed, e.g., affect the amount or type of build material to use, the amount of fluid to use, and so forth. Alternatively, as another example, the shape of a portion of a 3D object can be distorted due to heat produced by printing another portion of the 3D object. Another example of interaction with a 3D printing process can include a chemical reaction, such as a chemical reaction due to presence of chemicals used that can trigger phase change. Interactions between different portions of the 3D object can be determined based on historical empirical data collected in the past indicating how parameters of the 3D printing process affect formation of portions of a 3D object.

Additionally, in some examples, machine code in machine code vectors for controlling robot operations or cutter operations can be customized based on material properties to be printed by the 3D printing process. For example, some build materials may be more viscous than other build materials, which can affect how a robot physically manipulates a 3D object portion, or how a cutter cuts the 3D object portion. More generally, information in the voxels can be modified to achieve a target result of the 3D printing process.

The process of FIG. 3 further includes combining (at 312) information of the voxels to produce 3D printing instructions that control how the 3D printing system builds the 3D object (similar to task 104 in FIG. 1).

Figure 4:
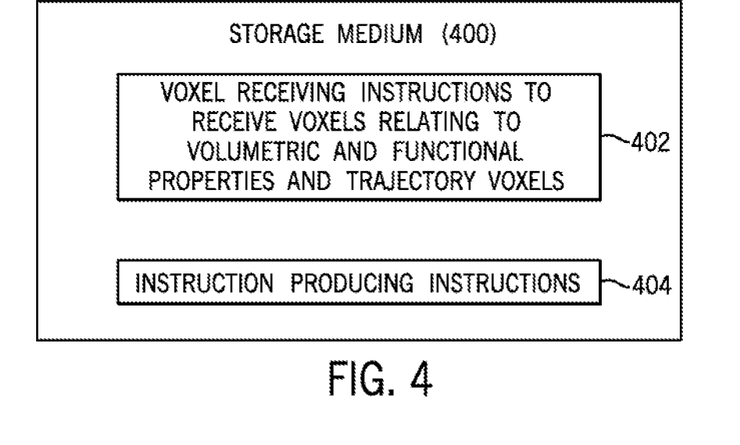
FIG. 4 is a block diagram of a storage medium storing instructions according to some examples.

FIG. 4 is a block diagram of a non-transitory machine-readable or computer-readable storage medium 400 that stores machine-readable instructions that upon execution can cause a system to perform corresponding tasks. The machine-readable instructions include voxel receiving instructions (402) that receive voxels that relate to a volumetric property and a functional property of portion of a 3D object to be formed by a 3D printing system, and trajectory voxels containing information to guide operation of a machine in physically manipulating, long trajectories, portions of the 3D object during 3D printing. The machine-readable instructions further include instruction producing instructions (404) to produce, in response to the voxels that relate to the volumetric property and the functional property and the trajectory voxels, instructions that control the 3D printing system to build the 3D object.

Figure 5:
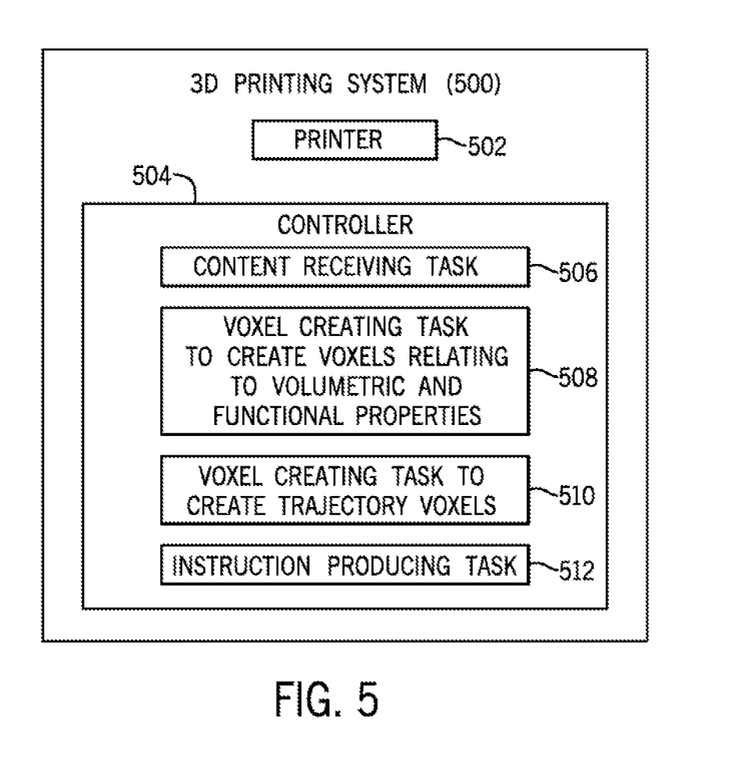
FIG. 5 is a block diagram of a 3D printing system according to further examples.

FIG. 5 is a block diagram of a 3D printing system 500 according to some implementations. The 3D printing system 500 includes a printer 502 to form build material layers to build a 3D object. The printer 502 can include the build material deposition equipment 206 and the fluid dispensing equipment 210 of FIG. 2, for example. The 3D printing system 500 further includes a controller 504 that executes the following tasks. The tasks include a content receiving task (506) to receive content representing the 3D object, where the content can be produced by a content generator. The tasks also include a voxel creating task (508) to create, based on the content, voxels relating to a volumetric property and a functional property of portions of the 3D object to be formed by the 3D printing system, a voxel creating task (510) to create, based on the content, trajectory voxels containing information to guide operation of a robot that manipulates portions of the 3D object during 3D printing. The tasks further include an instruction producing task (512) to produce instructions that control the 3D printing system to build the 3D object, where the produced instructions are based on combining information of the voxels relating to a volumetric property and a functional property in the information of the trajectory voxels.

The storage medium 400 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of a system comprising a processor, comprising:
   receiving a data representation that comprises:
      voxels relating to a volumetric property and a functional property of regions of a three-dimensional (3D) object to be formed by a 3D printing system, the voxels comprising coordinates in 3D space of the volumetric property and the functional property, and
      trajectory voxels containing control information to guide operation of a robot that manipulates portions of the 3D object during 3D printing by the 3D printing system, the control information in the trajectory voxels associated with coordinates in the 3D space, wherein the coordinates in the 3D space that are associated with the control information are included in the trajectory voxels; and
   combining, based on the coordinates in the trajectory voxels and the coordinates in the voxels relating to the volumetric property and the functional property, information in the voxels relating to the volumetric property and the functional property and the control information in the trajectory voxels to produce instructions that control the 3D printing system to build the 3D object.

2. The method of claim 1, wherein the data representation further comprises curve size voxels relating to sizes of curves to be formed, and wherein the combining further comprises combining information of the curve size voxels with:
the information in the voxels relating to the volumetric property and the functional property, and
the control information in the trajectory voxels.

3. The method of claim 1, wherein the robot that manipulates the portions of the 3D object during the 3D printing makes physical contact with the portions of the 3D object to manipulate the portions along trajectories.

4. The method of claim 3, wherein the control information in the trajectory voxels to guide the operation of the robot in manipulating the portions of the 3D object comprises machine program code that controls the operation of the robot that moves the portions of the 3D object during the 3D printing.

5. The method of claim 3, wherein the control information in the trajectory voxels to guide the operation of the robot in manipulating the portions of the 3D object comprises machine program code to guide a cutting operation of a cutter that cuts the portions of the 3D object.

6. The method of claim 1, wherein the control information in the trajectory voxels comprise machine commands, and wherein the combining of the information in the voxels relating to the volumetric property and the functional property and the control information in the trajectory voxels to produce the instructions comprises:
mapping, based on the coordinates in the voxels relating to the volumetric property and the functional property, volumetric property values and functional property values in the voxels relating to the volumetric property and the functional property to respective locations in the 3D space; and
associating the machine commands in the trajectory voxels to respective portions of the 3D object based on the coordinates in the trajectory voxels,
wherein the instructions include the machine commands and are to control the robot to produce portions of the 3D object having the volumetric property values and the functional property values.

7. The method of claim 6, wherein the instructions further include pause instructions that pause selected operations of the 3D printing system during the 3D printing while the machine commands are executed to control the operation of the robot.

8. The method of claim 1, further comprising modifying information of the data representation to compensate for interaction with a 3D printing process performed by the 3D printing system.

9. The method of claim 8, wherein the modifying of the information of the data representation comprises modifying the information of the data representation to compensate for interaction caused by heat or a chemical reaction produced by the 3D printing process.

10. The method of claim 8, wherein the modifying of the information of the data representation comprises customizing commands in the trajectory voxels that control the operation of the robot based on a material to be manipulated by the robot during the 3D printing.

11. A non-transitory machine-readable storage medium storing machine-readable instructions that upon execution cause a system to:

receive voxels relating to a volumetric property and a functional property of regions of a three-dimensional (3D) object to be formed by a 3D printing system, and trajectory voxels containing control information to guide operation of a robot in physically manipulating, along trajectories, portions of the 3D object during 3D printing by the 3D printing system, the voxels relating to the volumetric property and the functional property comprising coordinates in 3D space of the volumetric property and the functional property, and the control information in the trajectory voxels associated with coordinates in the 3D space, wherein the coordinates in the 3D space that are associated with the control information are included in the trajectory voxels; and
produce instructions that control the 3D printing system to build the 3D object, the producing of the instructions based on combining, according to the coordinates in the trajectory voxels and the coordinates in the voxels relating to the volumetric property and the functional property, information in the voxels relating to the volumetric property and the functional property and the control information in the trajectory voxels.

12. The non-transitory machine-readable storage medium of claim 11, wherein the machine-readable instructions upon execution cause the system to further:
determine a characteristic of the 3D object to be formed by the 3D printing system; and
based on the determined characteristic, produce the control information to control movement of the robot.

13. The non-transitory machine-readable storage medium of claim 11, wherein the producing of the instructions comprises:
aligning information in the voxels relating to the volumetric property and the functional property and the control information in the trajectory voxels, based on the coordinates in the voxels relating to the volumetric property and the functional property and the coordinates in the trajectory voxels; and
synchronizing operation of components of the 3D printing system using the information in the voxels relating to the volumetric property and the functional property and the control information in the trajectory voxels.

14. A three-dimensional (3D) printing system comprising:
a printer to form build material layers to build a 3D object; and
a controller to:
receive content representing the 3D object,
create, based on the content, voxels relating to a volumetric property and a functional property of portions of the 3D object to be formed by the 3D printing system, the voxels comprising coordinates in 3D space of the volumetric property and the functional property,
create, based on the content, trajectory voxels containing machine program code to guide operation of a robot that manipulates portions of the 3D object during 3D printing by the 3D printing system, the machine program code in the trajectory voxels associated with coordinates in the 3D space, wherein the coordinates in the 3D space that are associated with the machine program code are included in the trajectory voxels, and
produce instructions that control the 3D printing system to build the 3D object, the instructions based on combining, according to the coordinates in the trajectory voxels and the coordinates in the voxels relating to the volumetric property and the functional property, information in the voxels relating to the volumetric property and the functional property and the machine program code in the trajectory voxels.

15. The 3D printing system of claim 14, wherein the machine program code in the trajectory voxels comprises G-codes that guide the operation of the robot.

16. The non-transitory machine-readable storage medium of claim 11, wherein the combining:
   maps, according to the coordinates in the voxels relating to the volumetric property and the functional property, volumetric property values and functional property values in the voxels relating to the volumetric property and the functional property to respective locations in the 3D space, and
   maps machine commands in the control information to respective portions of the 3D object according to the coordinates in the trajectory voxels.

17. The non-transitory machine-readable storage medium of claim 11, wherein the combining comprises time aligning values of the volumetric property and the functional property in the voxels relating to the volumetric property and the functional property, with the control information in the trajectory voxels.

* * * * *